United States Patent [19]
Wiedeman

[11] Patent Number: 6,128,487
[45] Date of Patent: Oct. 3, 2000

[54] GLOBAL MOBILE PAGING SYSTEM

[75] Inventor: Robert A Wiedeman, Los Altos, Calif.

[73] Assignee: Globalstar, L.P., San Jose, Calif.

[21] Appl. No.: 09/003,845

[22] Filed: Jan. 7, 1998

Related U.S. Application Data

[63] Continuation-in-part of application No. 08/834,238, Apr. 15, 1997, Pat. No. 5,884,142.

[51] Int. Cl.[7] .............................. H04Q 7/20; H04B 7/185
[52] U.S. Cl. ......................... 455/426; 455/445; 455/12.1
[58] Field of Search .................................. 455/12.1, 13.1, 455/426, 427, 428, 430, 445, 458, 31.3, 38.1, 31.2, 510

[56] References Cited

U.S. PATENT DOCUMENTS

| | | | |
|---|---|---|---|
| Re. 32,905 | 4/1989 | Baran | 370/104 |
| 4,901,307 | 2/1990 | Gilhousen et al. | 370/18 |
| 5,010,317 | 4/1991 | Schwendeman et al. | 340/311.1 |
| 5,073,900 | 12/1991 | Mallinckrodt | 375/1 |
| 5,081,703 | 1/1992 | Lee | 455/13 |
| 5,109,390 | 4/1992 | Gilhousen et al. | 375/1 |
| 5,119,225 | 6/1992 | Grant et al. | 359/172 |
| 5,216,427 | 6/1993 | Yan et al. | 342/352 |
| 5,233,626 | 8/1993 | Ames | 375/1 |
| 5,239,671 | 8/1993 | Linquist et al. | 455/13.1 |
| 5,265,119 | 11/1993 | Gilhousen et al. | 375/1 |
| 5,287,541 | 2/1994 | Davis et al. | 455/427 |
| 5,301,354 | 4/1994 | Schwendeman et al. | 455/13.1 |
| 5,303,286 | 4/1994 | Wiedeman | 379/59 |
| 5,339,330 | 8/1994 | Mallinckrodt | 375/1 |
| 5,404,569 | 4/1995 | Schwendeman et al. | 455/427 |
| 5,410,728 | 4/1995 | Bertiger et al. | 455/13.1 |

(List continued on next page.)

FOREIGN PATENT DOCUMENTS

| | | |
|---|---|---|
| 0 421 698 A2 | 10/1991 | European Pat. Off. . |
| WO 90/13186 | 11/1990 | WIPO . |
| WO 91/09473 | 6/1991 | WIPO . |
| WO 93/09613 | 5/1993 | WIPO . |

OTHER PUBLICATIONS

Petition of American Mobile Satellite Corporation Before the FCC, Washington, DC 20554, dated Jun. 3, 1991, pp. 1–15.

Application of Motorola Satellite Communications, Inc. for IRIDIUM A Low Earth Orbit Mobile Satellite System before the FCC, Washington, D.C. Dec. 1990. pp. 49–96.

Before the FCC, Washington, D.C. 20554, Aries Constellation Low Earth Orbit Satellite System Proposal of Constellation Communications, Inc. Jun. 3, 1991, Appendix A, B, and C.

Application of TRW Inc. for Authority to Construct a New Communications Satellite System Odyssey before the FCC, Washington, D.C. 20554, May 31, 1991 pp. 33–51.

(List continued on next page.)

Primary Examiner—Nguyen Vo
Attorney, Agent, or Firm—Ohlandt, Greeley, Ruggiero & Perle L.L.P.

[57] ABSTRACT

A communications system (10) includes at least one satellite (105), at least one terrestrial gateway (103) capable of being bidirectionally coupled to the at least one satellite, at least one terrestrial paging system (109), and at least one user unit (106) capable of being wirelessly coupled to the terrestrial gateway, through the at least one satellite, or to the terrestrial paging system. The gateway includes a paging system (300) for receiving a page message for the user unit, for storing the received page message, and for selectively delivering the received page message to the user unit through the satellite system or through the terrestrial paging system. The gateway is bidirectionally coupled to the terrestrial paging system through the at least one satellite, a virtual gateway (107), and a pager interface unit (108). The pager interface unit includes a pager message and retrieval system (108*a*) for storing a page message until it is determined that the page message can be one of successfully delivered or not successfully delivered to the user unit via the terrestrial paging system. Stored page messages can be later recalled and delivered to the user.

35 Claims, 10 Drawing Sheets

U.S. PATENT DOCUMENTS

| | | | |
|---|---|---|---|
| 5,415,368 | 5/1995 | Horstein et al. | 244/158 R |
| 5,422,647 | 6/1995 | Hirshfield et al. | 342/354 |
| 5,433,726 | 7/1995 | Horstein et al. | 244/158 R |
| 5,439,190 | 8/1995 | Horstein et al. | 244/158 |
| 5,446,756 | 8/1995 | Mallinckrodt | 375/200 |
| 5,448,623 | 9/1995 | Wiedeman et al. | 379/59 |
| 5,448,759 | 9/1995 | Krebs et al. | 455/517 |
| 5,551,624 | 9/1996 | Horstein et al. | 244/158 R |
| 5,752,162 | 5/1998 | Sawyer et al. | 455/13.1 |
| 5,884,142 | 3/1999 | Wiedeman et al. | 455/12.1 |

OTHER PUBLICATIONS

Application of Ellipsat Corporation Ellipsat for the Authority to Construct ELLISPO I An Elliptical Orbit Satellite System, before the FCC, Washington, D.C. 20554, Nov. 2, 1990, pp. 5–34.

Application of Loral Cellular Systems, Corp., Globalstar Mobile COmmunications Wherever You Are, before the FCC, Washington, D.C. Jun. 3, 1991, pp. 94–187.

"An Integrated Satellite–Cellular Land Mobile System for Europe", E. Del Re, University of Florence, Dept, of Electronics Engineering, italy, Sep. 21, 1989.

"Current and Future Mobile Satellite Communication Systems", S. Kato et al., IEICE Transactions, vol. E 74, No. 8 Aug. 1991, pp. 2201–2210.

"Digital Network Oriented Mobile Radio Satellite System as an Integrated Part of the GSM Cellular Radio System in Europe", P. Dondl, Deutsch BUndespost/Fernmeldetechniches Zentralmt/Darmstadt, Sep. 21, 1989 Fed. Rep. Germ.

"The OmniTRACS® Mobile Satellite Communications and Positioning System", E. Tiedemann, Jr. et al., Vehicle Electronics in the 90's: Proceedings of the In'l. Congress on Transporation Electronics, Oct. 1990.

"Software Implementation of a PN Spread Spectrum Receiver to Accommodate Dynamics", C. Cahn et al., IEEE Trans. on Comm., vol. COM–25, No. 8, Aug. 1977.

"A Communication Technique for Multipath Channels", R. Price, Proceedings of the IR, Mar. 1958, pp. 555–570.

"Increased Capacity Using CDMA for Mobile Satellite Communication", K. Gilhousen et al., IEEE Journal on Selected Areas in Communications, vol. 8, No. 4, May 1990, pp. 503–514.

"The Iridium $^{TM1}$ System—A Revolutionary Satellite Communications System Developed with Innovative Applications of Technology", D. Sterling et al., IEEE, MILCOM 1991, Nov. 4–7.

"Iridium: Key to Worldwide Cellular Communications", J. Foley, Telecommunications, Oct. 1991, pp. 23–28.

GLOBAL MOBILE PAGING SYSTEM

CROSS-REFERENCE TO RELATED PATENT APPLICATION

This patent application is a continuation-in-part of U.S. patent application Ser. No. 08/834,238, filed Apr. 15, 1997, now U.S. Pat. No. : 5,884,142, issued on Mar. 16, 1999, entitled "Low Earth Orbit Distributed Gateway Communication System", by Robert A. Wiedeman and Paul A. Monte.

FIELD OF THE INVENTION

This invention relates generally to satellite communication systems and, in particular, to satellite communication systems that provide paging services for subscribers having user terminals.

BACKGROUND OF THE INVENTION

Conventional paging systems utilize terrestrial delivery systems to provide paging and short messages to and from user terminals. These messages may include the delivery of E-mail and other stored messages that are sent via the Internet. These systems are local in nature, or at best are national systems. The advent of Mobile Satellite Systems (MSS) allows an extension of these systems to a global delivery of paging and other messages. Prior satellite-based systems, such as one known as Iridium, require on-board satellite processing to deliver messages to users which are known to be in certain locations. In such systems a central database, or distributed databases, use the satellites to deliver the paging traffic.

However, these and similar systems are inefficient since the user may be indoors and blocked to the satellite, thus preventing the satellite from delivering the message. The user terminal may also be turned off, and unable to receive paging messages.

Also, in conventional paging systems a user cannot roam from one paging system to another, since the paging systems are typically so different as to render the pager from one system unable to operate in the other.

OBJECTS AND ADVANTAGES OF THE INVENTION

It is a first object and advantage of this invention to provide a communications system that enables users to receive paging messages through one of a satellite-based communications system or through a conventional terrestrial paging system, based at least in part on a location or availability of the user.

It is a further object and advantage of this invention to provide a communications system that enables users to receive stored page messages through one of a satellite-based communications system or through a conventional terrestrial paging system.

It is another object and advantage of this invention to provide a communications system that enables paging users to roam freely over wide geographical areas, and to receive paging messages through one of a satellite-based communications system or through a conventional terrestrial paging system.

SUMMARY OF THE INVENTION

The foregoing and other problems are overcome and the objects and advantages are realized by methods and apparatus in accordance with embodiments of this invention.

A satellite communication system in accordance with this invention delivers a page message from a user's home gateway to a delivering terrestrial gateway for future delivery of the paging message, or for recovery of the message by the user.

The use of this invention enables a user to roam between regions where there are incompatible paging systems, while allowing the user to employ a compatible terrestrial paging system if it is available.

A communications system in accordance with an embodiment of this invention includes at least one satellite, at least one terrestrial gateway capable of being bidirectionally coupled to the at least one satellite, at least one terrestrial paging system, and at least one user unit capable of being wirelessly coupled to the terrestrial gateway, through the at least one satellite, or to the terrestrial paging system. The gateway includes a paging system for receiving a page message for the user unit, for storing the received page message, and for selectively delivering the received page message to the user unit through one of the at least one satellite or through the terrestrial paging system. The gateway is bidirectionally coupled to the terrestrial paging system through the at least one satellite, a virtual gateway, and a pager interface unit. The pager interface unit includes a pager message and retrieval system for storing a page message until it is determined that the page message can be one of successfully delivered or not successfully delivered to the user unit via the terrestrial paging system. The gateway selectively delivers the received page message based on a content of at least one of a Home Location Register or a Visitor Location Register. The gateway selectively delivers the stored page message using at least one retry through an originally selected page message delivery route or through an alternate page message delivery route. The gateway is further responsive to an acknowledgement of page message delivery for recording the delivery of the page message for billing purposes. In like manner the pager interface unit is responsive to an acknowledgement of page message delivery through the terrestrial paging system for storing an indication of the delivery of the page message, and for transmitting the stored indication to the gateway through the virtual gateway and at least one satellite. For a case where the attempted delivery of the page message is unsuccessful, and at some future time, the system informs a user of the user unit of the existence of the stored page message and, in response to a request from the user, retrieves and delivers the stored page message.

In a further embodiment of this invention the user unit operates only with the terrestrial paging system, and all received and stored pages at the gateway (home gateway or roamed-to gateway) are delivered via the satellite, virtual gateway, and pager interface unit.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1A:
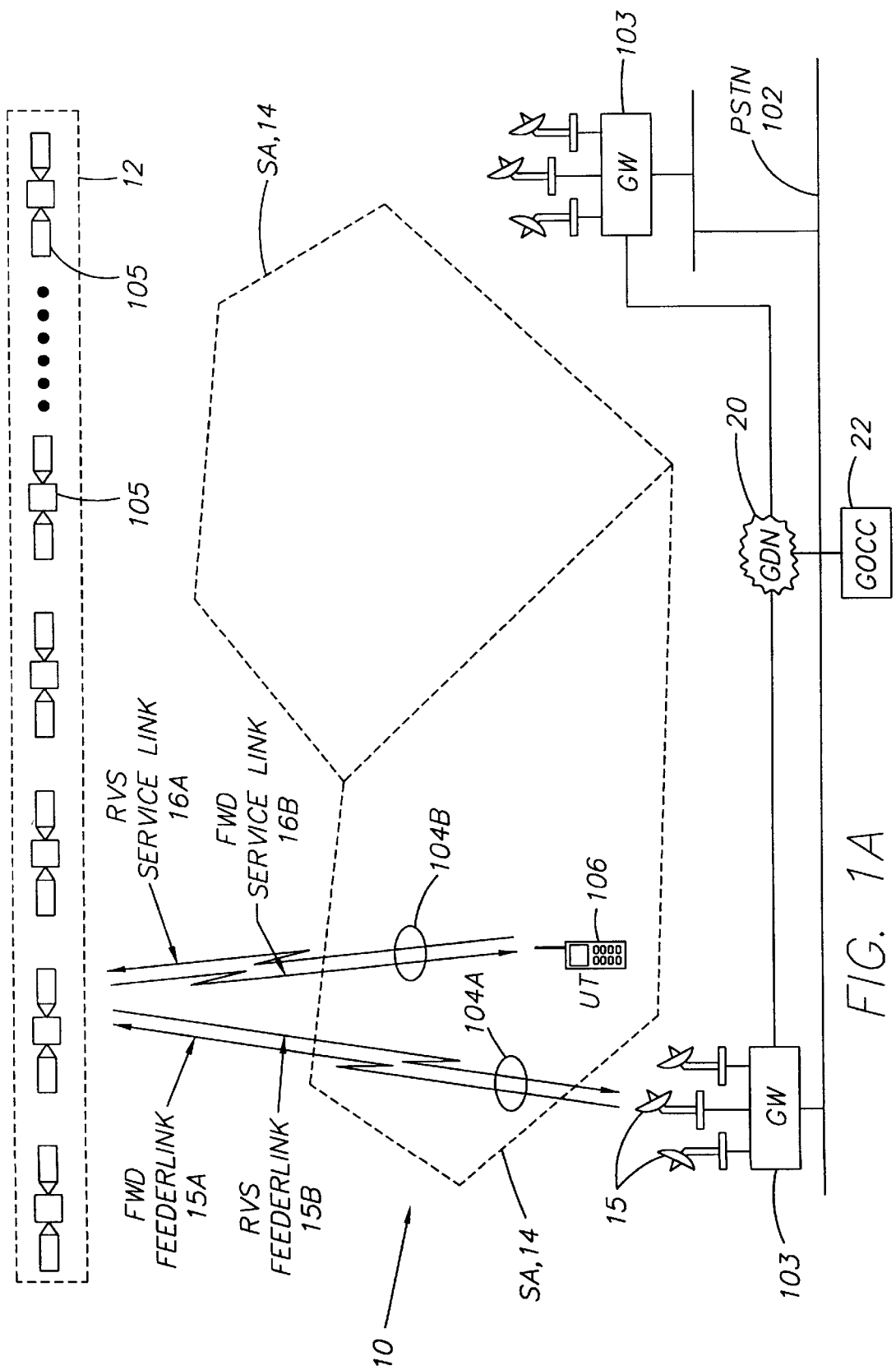
FIG. 1A is a simplified block diagram of a satellite communications system in accordance with this invention, the satellite communications system including a constellation of satellites, PSTN-connected terrestrial gateways (GWs) connected through a ground data network (GDN) to a ground operations control center (GOCC), and handheld, vehicle mounted, or fixed user terminals or units.

Referring to FIG. 1A, a satellite communications system 10 includes a constellation 12 of satellites 105, which may be in geosynchronous or non-geosynchronous orbits, a plurality of terrestrial gateways (GWs) 103, and a plurality of user terminals (UTs), also referred to herein as dual mode pagers or as user units 106, only one of which is shown. Each GW 103 has an associated GW service area 14, and is connected to a terrestrial telecommunications network, such as the public switched telephone network (PSTN) 102. A ground data network (GDN) 20 connects the GWs 103 to a ground operations control center (GOCC) 22. The GOCC 22 is responsible, among other things, for deriving long-term system resource allocation plans based at least in part on historic system usage patterns, and for communicating these plans to the GWs 103. The GWs 103 are responsible for implementing the long-term plans, as well as for making real-time adjustments to the plans to accommodate fluctuations in demand, the presence of RF signal obstructions and blockages between the satellites 105 and the user units 106, momentary fades, the presence of interference from external sources, and other factors that can influence the operation of the system 10.

The user unit 106 receives signals relayed through the satellites 105 to and from the GWs 103. GW antennas 15 provide forward feederlinks 15A and reverse feederlinks 15B, and for a non-geosynchronous satellite case (e.g., LEO or MEO) are capable of tracking the satellites as they move across the sky. The satellites 105 can be bent pipe repeaters that transmit a forward service link 16A to the UT 106 and that receive a reverse service link 16B from the UT 106. The user unit 106, if capable of voice and/or data communications, can be connected to the PSTN 102 though the GW 103, whose service area 14 contains the UT, and through one or more of the satellites 105. In a preferred embodiment of this invention the feederlinks 15A, 15B and the service links 16A and 16B are direct sequence (DS)-CDMA links, although in other embodiments TDMA links could be used as well.

Reference can be had to the following U.S. Patents for teaching embodiments of satellite communications systems that are suitable for use in practicing this invention: U.S. Pat. Nos. 5,233,626 issued Aug. 3, 1993, "Repeater Diversity Spread Spectrum Communication System", Ames; 5,592,481 issued Jan. 7, 1997, "Multiple Satellite Repeater Capacity Loading With Multiple Spread Spectrum Gateway Antennas", Wiedeman et al.; 5,448,623 issued Sep. 5, 1995, "Satellite Telecommunications System Using Network Coordinating Gateways Operative With A Terrestrial Communication System", Wiedeman et al.; 5,303,286 issued Apr. 12, 1994, "Wireless Telephone/Satellite Roaming System", Wiedeman; 5,619,525 issued Apr. 8, 1997, "Closed Loop Power Control For Low Earth Orbit Satellite Communications System", Wiedeman et al.; and 5,422,647, issued Jun. 6, 1995, "Mobile Communication Satellite Payload", Hirshfield et al. The disclosures of these U.S. Patents are incorporated by reference herein in their entireties.

By way of introduction, in a global mobile satellite system (GMSS) users are generally logged into one of the gateways 103 which provides services to the user while the user is within range of the serving satellites 105 and the gateway 103. The user is generally assigned to a gateway when he powers up his terminal or user unit 106. The location of the gateway 103 may be the user's "home" gateway or another "remote" gateway. A description of one suitable technique for logging in user terminals may be found in U.S. Pat. No. 5,526,404 by R. A. Wiedeman and P. A. Monte, the disclosure of which is incorporated by reference herein in its entirety. The user unit 106, after logging into a gateway 103, is known to be attached to the roamed to gateway by virtue of his user terminal being logged into a visitor location register (VLR), which generally has been authenticated by the user's home location register (HLR).

One problem that may arise with a global paging system is that the user may have (a) turned off the user terminal; (b) moved into a building or to some location where the user terminal is blocked to the satellites; (c) moved to another location and is no longer able to be reached from the assigned gateway; or (d) or has selected a mode of terminal usage which prevents receiving the page signal. In any of these exemplary cases the user unit 106 is not capable of receiving satellite pages.

Identification (ID) of the user terminal may be by several means. The user unit 106 may have an electronic serial number (ESN) which is a GMSS telephone number unique to the global system that is being used, a local telephone number, or a terrestrial paging number and ID.

Paging systems are generally used to notify users of telephone calls to the user which were not able to be delivered due to the user being busy or not available for any of the above mentioned reasons. Usually the user informs the caller that if you cannot reach me, call this number to reach my pager. Alternatively, if the user has not provided this number, a computer generated voice may tell the caller to select a number on a touch tone dial pad on a telephone, and the user is then lead through a series of steps which allows the caller to send a message to the system user. There are other methods of generating the page message. However accomplished, the page message is formed by the caller and delivered to the user's "home" gateway, or in some cases the visited gateway.

Figure 1B:
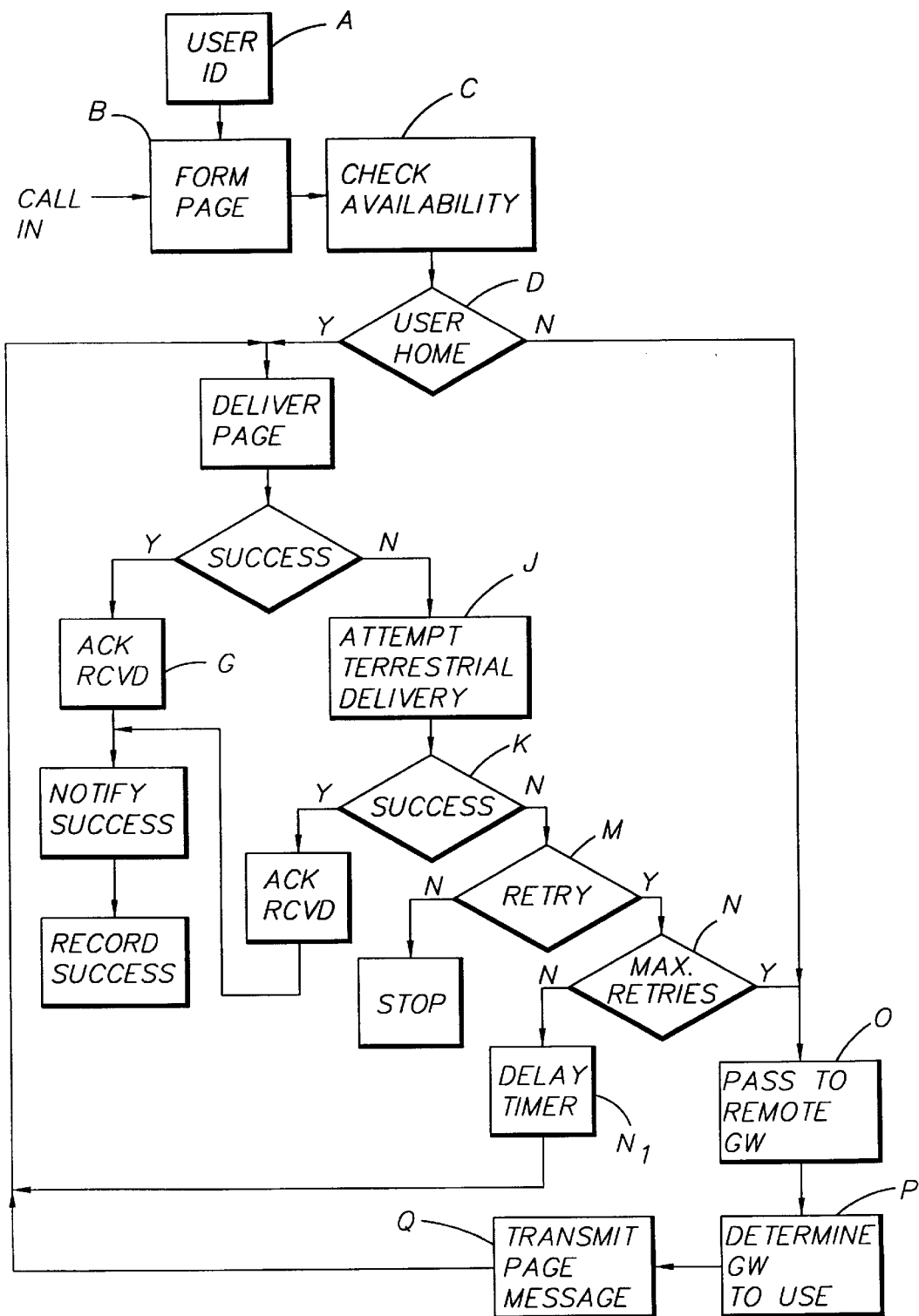
FIG. 1B is a logic flow diagram of a method in accordance with this invention.

As is shown in FIG. 1B, the thus formed page is merged with the user ID and prepared for delivery (blocks A, B, C). If the user is at the "home" location, after authenticating, the user is paged, and if an acknowledgment (ACK) is received from the paged user the page is considered to be delivered (blocks D, E, F, G). In this case the message is released and the system returns to standby (blocks H, I). However, if the user is not currently registered in the "home" gateway, or if registered but not available, the system must perform some additional tasks. One of these tasks, if the user is in the "home" location, is to store the message until a later time and deliver it at a time when the user is available. However, this implies that some record of user availability must be maintained, resulting in feedback from the user as to his availability. Furthermore, since many messages are time critical it is important to deliver the page as soon as possible. One method, in accordance with this invention, is to attempt delivery via a second system, typically a local terrestrial system which can more easily penetrate buildings and other RF obstructions.

Figure 2:
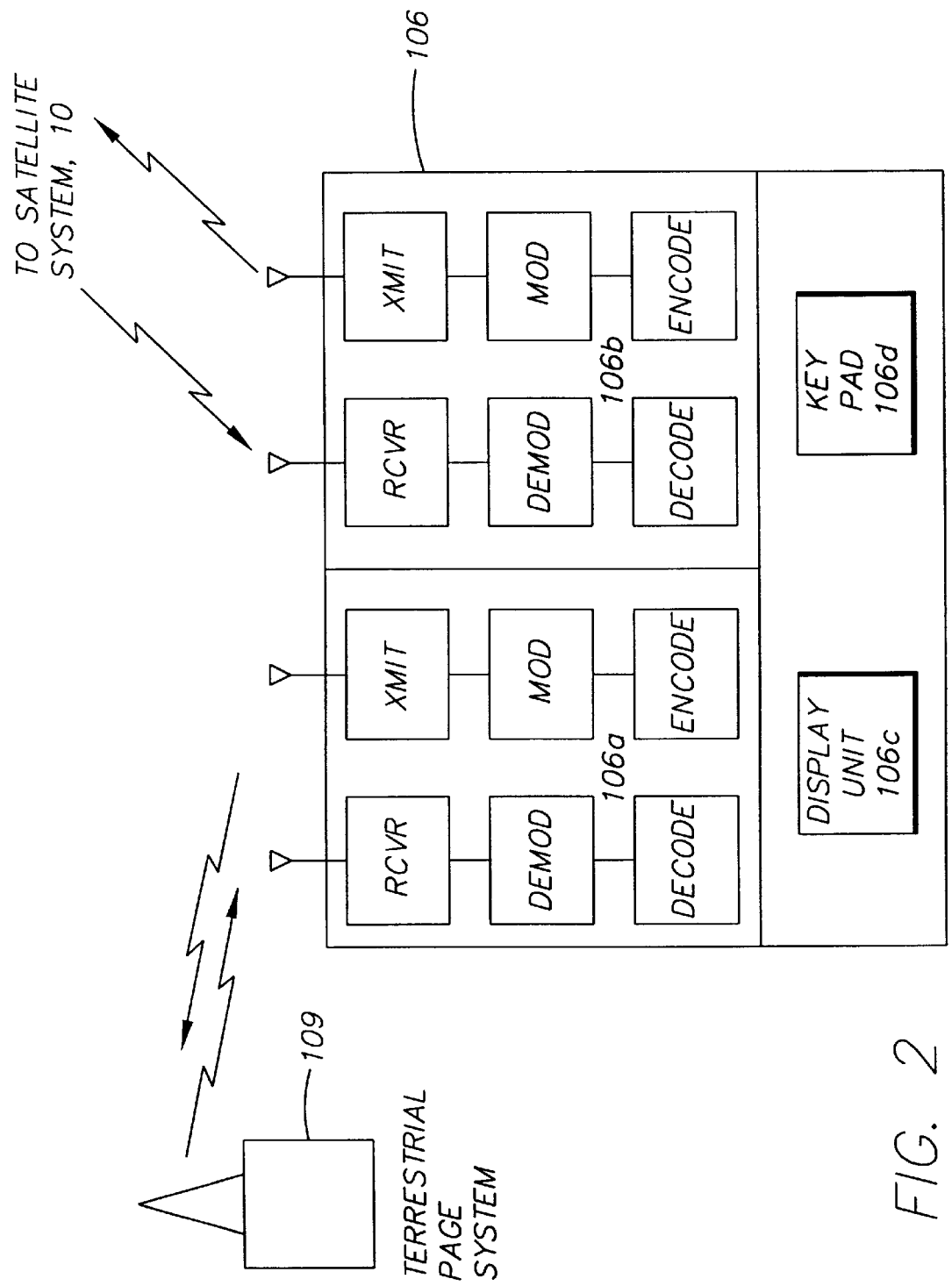
FIG. 2 is a simplified block diagram of a dual pager mode user unit.

Still referring to FIG. 1B, if satellite delivery of the page has been unsuccessful the system then notifies the terrestrial system and delivery is attempted via a "dual mode" pager system (blocks J, K, L, M). In this case the user is assumed to have a dual-mode terrestrial and a satellite paging unit 106 as shown in FIG. 2. Typically the unit 106 has two separate Radio Frequency (RF) chains 106a and 106b, and two separate modulation units if required. A display 106c and key pad 106d may be reused in the two different systems. Returning to FIG. 1B, if the terrestrial delivery is unsuccessful after some number of retries (block N), then the message is passed to a remote gateway and the message again transmitted (blocks O, P, Q).

Figure 3A:
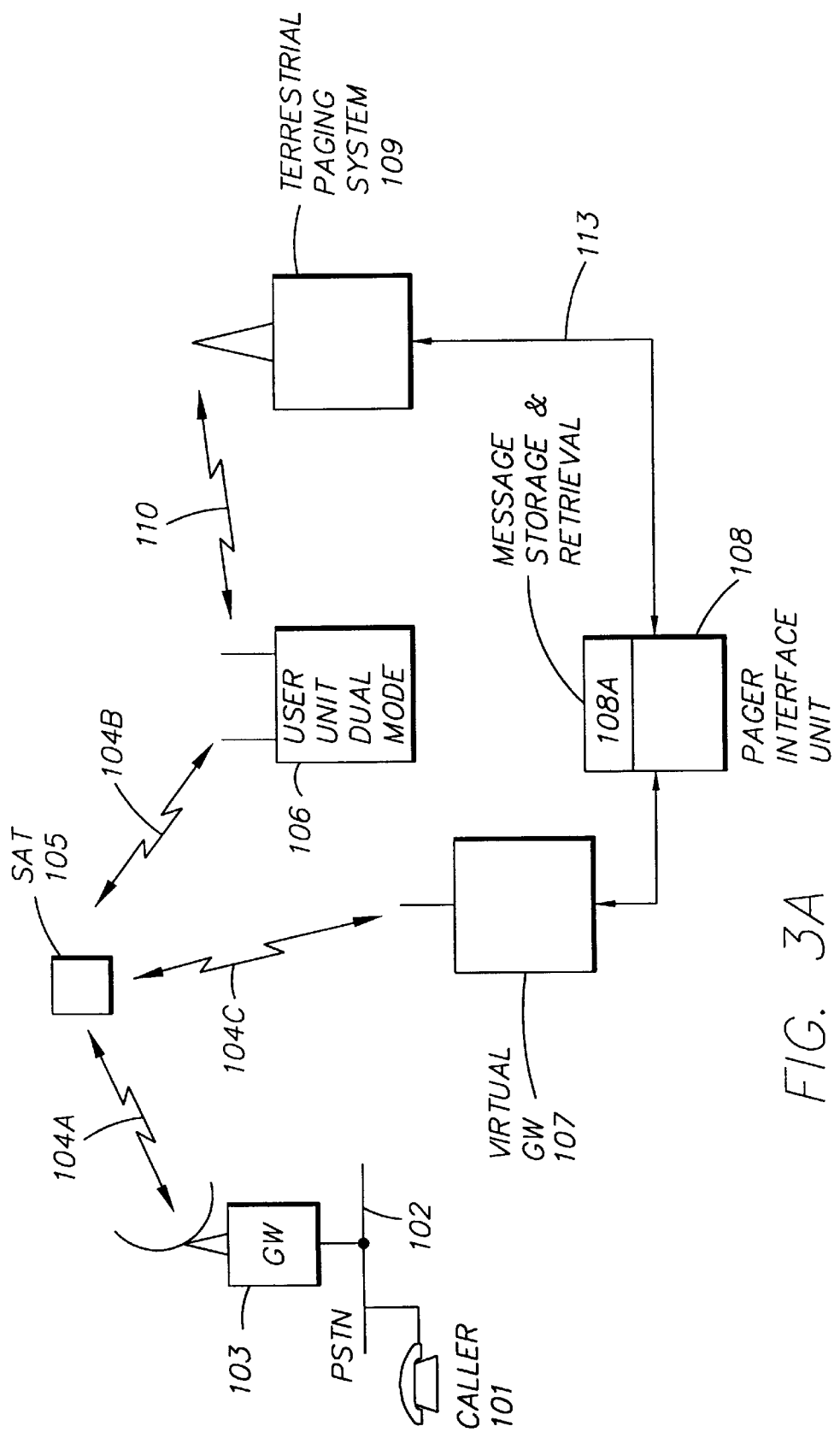
FIG. 3A is a system level block diagram of a dual mode satellite/terrestrial pager system in accordance with an embodiment of this invention.
Figure 3B:
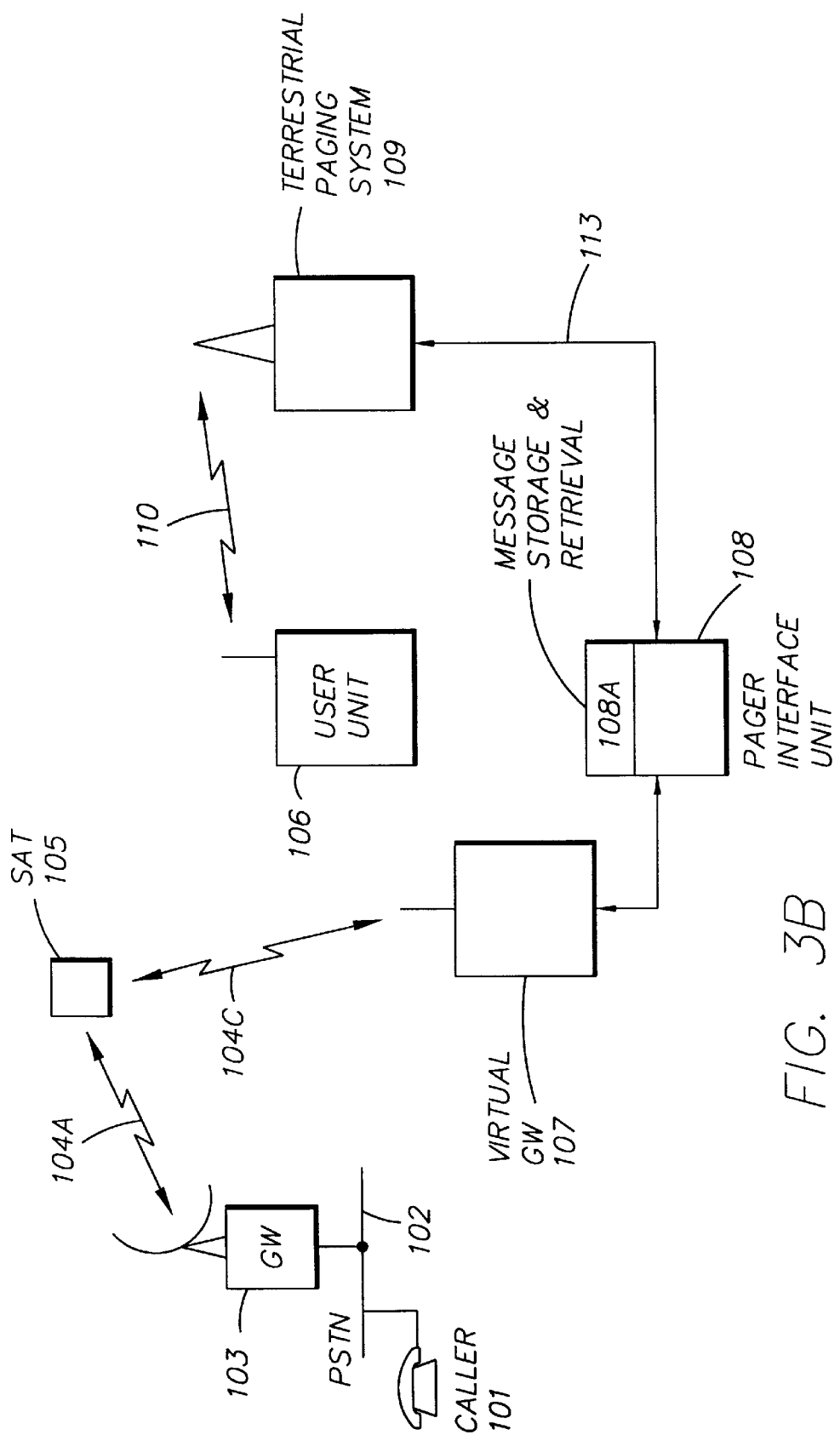
FIG. 3B is a system level block diagram of a single mode, terrestrial only, pager system in accordance with an embodiment of this invention.

As is shown in FIGS. 3a and 3b, it is not always necessary to utilize the direct satellite paging function. Consider the dual mode case, as shown in FIG. 3a. The caller 101 connects to the Public Switched Telephone Network PSTN (or any other network) 102. In turn, the number dialed routes the call to the "home" gateway 103 which in turn formats a paging signal and routes it over link 104(a) to the satellite 105 and thence to the dual mode pager or user unit 106 via link 104(b). If successful the operation is terminated. If unsuccessful, then the gateway 103 attempts delivery via the terrestrial system by formatting the page and routing it via link 104(a) to the satellite 105 and thence via link 104(c) to a 'virtual' gateway 107. The virtual gateway 107 is comprised of a transceiver operable in the frequency bands used by the user unit 106, and provides a local connection for the gateway 103 to the terrestrial communications infrastructure, in this case the terrestrial paging system 109. The virtual gateway 107 receives the page message and routes it via a terrestrial pager interface unit 108 and link 113 to the terrestrial paging system 109 for delivery over a terrestrial delivery link 110.

An alternative system, not requiring the use of a satellite paging receiver, allows the page to be delivered via only the terrestrial segment. Referring to FIG. 3b the caller 101 connects to the PSTN (or other network) 102 and thence to the gateway 103. The gateway then sends the page via the satellite 105 over links 104(a) and 104(c) to the virtual gateway 107, which then routes the page to the user unit 106 via the terrestrial paging system 109 in a similar manner as described above.

An underlying consideration in these and other approaches is how does one select and deliver the page message to the proper terrestrial system, considering that there are typically many such systems available and that the terrestrial systems in general have short range transmission characteristics.

A first step in delivering the page is to determine the location of the user that is employing the GMSS pager, then to select the means to send the page, then actually delivering the page, or attempting the delivery and retrying if necessary, followed by determining the success of the page delivery and properly accounting, billing and recording the successful delivery of the page. Each of these steps is now described in further detail.

Step 1. Determining the Location of the User

Global Mobile Satellite Systems generally employ position location as a means of logging in users and determining which gateways to serve the user. This is necessary because of the global nature of the system, the wide area coverage areas of the satellites, and the possibility of the user being in any one of several countries seen by the satellite or constellation of satellites. The position location method may be accomplished by the satellite constellation itself, registering the user upon user unit power up, or may include other means such as the use of the Global Positioning System (GPS) or any other suitable means. In any case, the user's position is known to the system, either by the gateway 103 or the virtual gateway 107, or by both.

Typically what is known by the system is the last known position of the user unit 106, although this position location information may be out of date, especially if the user has not been heard from for a long period of time. However, the last known position of the user unit 106 forms a good starting point.

Step 2: First Page Delivery Attempt-Dual Mode.

Assuming that the caller 101 has deposited a page request at the gateway 103, the user ID is appended to the page message and the database of the gateway 103 is checked for user availability. If the user has not notified the gateway 103, via a HLR interrogation by a VLR, that the user unit 106 is roaming, the gateway 103 assumes that the user unit is located within range of the "home" gateway 103. If an attempt to deliver the page is unsuccessful then an attempt to deliver via the terrestrial system 109 is made. The gateway 103, knowing that the user is located within a "virtual beam" and attached to a "virtual gateway" 107, attempts delivery via that system. After "n" tries the gateway 103 assumes that further delivery attempts will be fruitless and terminates page delivery.

Step 3: Second Page Delivery Attempt-Dual Mode

There are two potential solutions for a global paging message to be delivered to a user unit 106. The first solution assumes that the "home" gateway 103 has, and retains, knowledge of the location of the visiting gateway from the log-on interrogation performed at the time that the user unit 106 registered with the visited gateway. In this case the "home" gateway 103 need only retain knowledge of which of the gateways the user has roamed to, deliver the page message by some means, discussed below, to the visited gateway, and instruct the visited gateway to apply the procedure shown in FIG. 1, as discussed above, to deliver the page either by terrestrial or satellite means. The second solution assumes that the "home" gateway 103 has not retained the knowledge of the location of the user unit 106. In this case the "home" gateway 1 only need query all of the other gateways as to which gateway the user unit 106 is currently being served from. This may be accomplished by sending query messages over a Ground Data Network (GDN) which interconnects all gateways. Alternatively, this may be accomplished by using the satellite network itself. After learning of the user terminal's location, the page is sent to the currently serving gateway 103 for delivery.

Step 4: Accounting for the Delivery of the Page.

The system that successfully delivers the page notifies the "home" gateway 103 or point of presence (POP) of the caller communication and of the success of the delivery of the page message, thus terminating the paging message session.

Proper accounting of the session may be made by any or all of the gateways and/or terrestrial systems involved. Alternatively, accounting and billing of the pages may be accomplished by flat rates, or monthly or yearly fees.

The page messages may be sent to the remote gateways by several different techniques. Examples include, but are not limited to, via the PSTN or private networks 102, via the Ground Data Network 20 (which connects to all gateways 103), or via the Internet or any other suitable means.

Low Earth Orbit (LEO) satellite systems have a capability to deliver messages to the entire earth. A combination of gateway interconnection, user location knowledge, satellite store and forward capability, and interconnection allows for delivery of messages from one gateway to another without the use of terrestrial facilities. LEO Walker orbits, in particular, have a unique capability to distribute messages to be sent via the gateway/satellite relay as discussed above, or to be distributed via a terrestrial system.

Figure 4B:
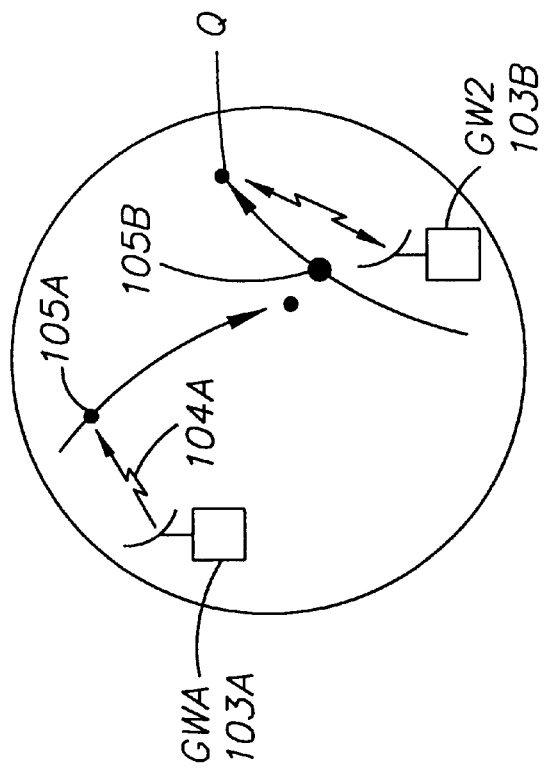
FIGS. 4A and 4B depict various satellite orbits and are useful in explaining the invention.
Figure 4A:
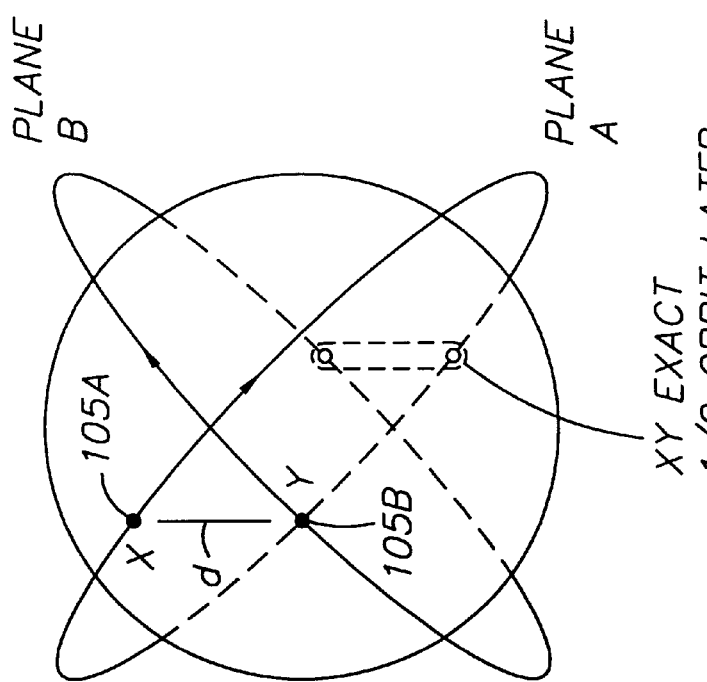

By example, and referring to FIG. 4a, a satellite 105a is orbiting in plane A in a given direction, and a second satellite 105b is orbiting in plane B also with a given direction. With certain numbers of satellite locations in each plane, and phasing of a particular nature, the two satellites at a point in time are a distance D apart. A typical constellation may use certain "Walker" orbits.

For the case of circular orbits the two satellites will again be in the same relative position to each other and the same distance apart exactly ½ orbit later. For many satellites in many planes a route may be calculated which minimizes the time that a message will remain in space and stored for delivery to the receiving gateway. In FIG. 4b there is a gateway (GW1) which may be the "home" gateway 103a, and at another location anywhere in the world there is another gateway GW2, referred to as a "remote" gateway 103b. The gateway 103a uplinks the paging message to an appropriate satellite (one predetermined by the gateway to be the optimum satellite to first carry the message) using link 104a to satellite 105a. The satellite 105a receives the message, demodulates the RF carrier, decodes (if necessary) the demodulated signal, and stores the message in on-board memory for later transport to either a gateway or another satellite. The satellite 105a moves along orbit path 111 in plane A to a point P 113, which has been predetermined, and prepares the message (along perhaps with others) for transfer. If the gateway that is addressed is visible to the satellite 105a it downloads the message to that gateway. If the gateway is not visible, it transfers the message to satellite 105b which is moving in a direction toward gateway GW2 103b. At a predetermined time satellite 105a transmits an RF carrier with the message encoded (if necessary) and modulated onto the carrier to satellite 105b. This transmission may be accomplished with an omnidirectional antenna or a directional antenna on satellite 105a, the directional antenna being pointed in the direction of satellite 105b. The signal thus transmitted is received by satellite 105b on either an omni-directional antenna or a directional antenna mounted on satellite 105b. If a directional antenna is used the directional antenna is pointed in the direction of satellite 105a. In any case, the signal is received by satellite 105b, is demodulated and decoded (if necessary), and is stored in on-board memory for later transport to either a gateway or another satellite. Satellite 105b then moves in space along the orbit path in Plane B 112 to another predetermined point Q 114, where the satellite 105b repeats the operation of satellite 105a in transferring the message to another satellite for transport to another location, or it downloads the message to gateway GW2 103b. This process is repeated until the final receiving satellite is located in a position in space to transfer the message to the gateway GW2 103b. At this time the satellite having carried the message through space prepares the message for transmission to the ground. At a predetermined time satellite 105b, or its successor satellite(s), transmits an RF carrier with the message encoded (if necessary) and modulated onto the carrier to gateway GW2 103b. This transmission may be accomplished with an omni-directional antenna or a directional antenna on satellite 105b or its successor satellite, the directional antenna being pointed in the direction of gateway GW2 103b. The signal thus transmitted over link 104b, is received by gateway GW2 103b on either an omni-directional antenna or a directional antenna. If a directional antenna is used the directional antenna is pointed in the direction of satellite 105b. The signal is received by the GW2 103b and is processed as follows.

Delivering Gateway Operations

Figure 5:
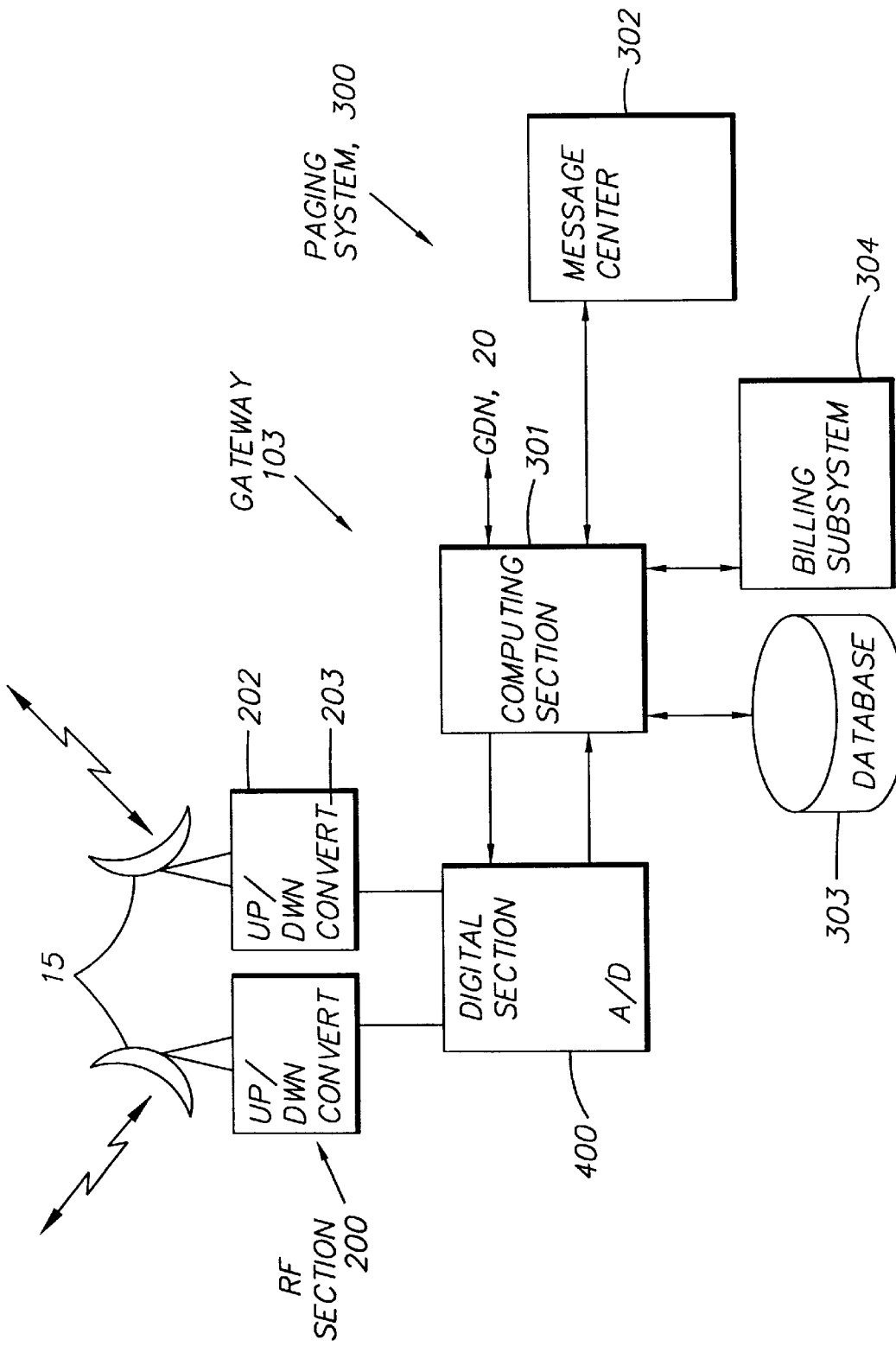
FIG. 5 is simplified block diagram of a terrestrial gateway having a paging system in accordance with this invention.

The signal containing the message is received by the gateway GW2 103b, which is shown in FIG. 5. The gateway 103b includes several sections. A first section is an RF section 200 that includes the antennas 15, other radio frequency components (not shown), up and down converters 202, 203 which amplify, filter, and frequency convert the incoming and outgoing messages. These messages are sent to the Digital Analog section 400 for conversion and routing. The paging messages are sent to the paging system 300, which comprises a computing section 301, a message center 302, a database 303, and a pager billing and accounting subsystem 304. The gateway system operates in the following manner.

Signals are downloaded from the carrying satellite 105 to the predetermined gateway GW2 103b. The signal containing the paging message is received by one or more of the gateway antennas 201, down converted and then passed to the digital/analog section 400. The message, after demodulation and decoding, is passed to the pager subsystem 300. The message is received in this section by the computing section 301. The header of the message, describing the user unit by its number, ESN, or other ID, is extracted and the destination determined. The computing section 301 then queries the database 303 for information regarding delivery. If the gateway 103b can deliver the message directly, the process described above and in FIG. 1B is followed. If the gateway cannot deliver the message directly, the process to deliver the message by the alternate delivery mechanism as described above and in FIGS. 3a and 3b is followed. If the message cannot be delivered by any of the techniques described above, the message is transferred to the message center 302 for future delivery, and if desired (optionally) a non-delivery message is formed and sent to the initiating gateway GW1 103a by means of either the GDN or via the same delivery mechanism as described above for message delivery to a remote gateway.

As a typical example, the following process is provided as the gateway operation proceeds to deliver the message to the intended user unit 106.

It is assumed that a message to a user has been received by the remote gateway GW2 103(b) and sent to the paging subsystem 300. There are three means of delivery. The first is satellite only, as shown in FIG. 6A, the second is satellite with terrestrial backup, as shown in FIG. 6B (or the reverse, terrestrial with satellite backup), and the third is terrestrial only, as shown in FIG. 6C.

The dual mode system operates to allow users to roam from one system to another, even if the roamed to system does not allow operation due to technical incompatibility. Consider a user with a dual mode pager which roams worldwide. In each location where the user may be located there will: (a) a compatible terrestrial paging system 109 accessible by normal terrestrial means; (b) a compatible terrestrial paging system 109 not accessible by normal terrestrial means; (c) no compatible terrestrial paging system 109 or no paging system at all.

In case a, the pager unit 106 works in the normal terrestrial manner, and may employ satellite backup if the terrestrial paging system 109 cannot reach the user. In case b, the user is paged by the satellite system 10 if available, and if it is not available, the invention provides a backup by terrestrial means, directed by the satellite system 10. In case c, the invention provides paging via satellite when the terrestrial system cannot be accessed because of, one, a lack of a terrestrial system or, two, the technical incompatibility of one system with another.

Figure 6A:
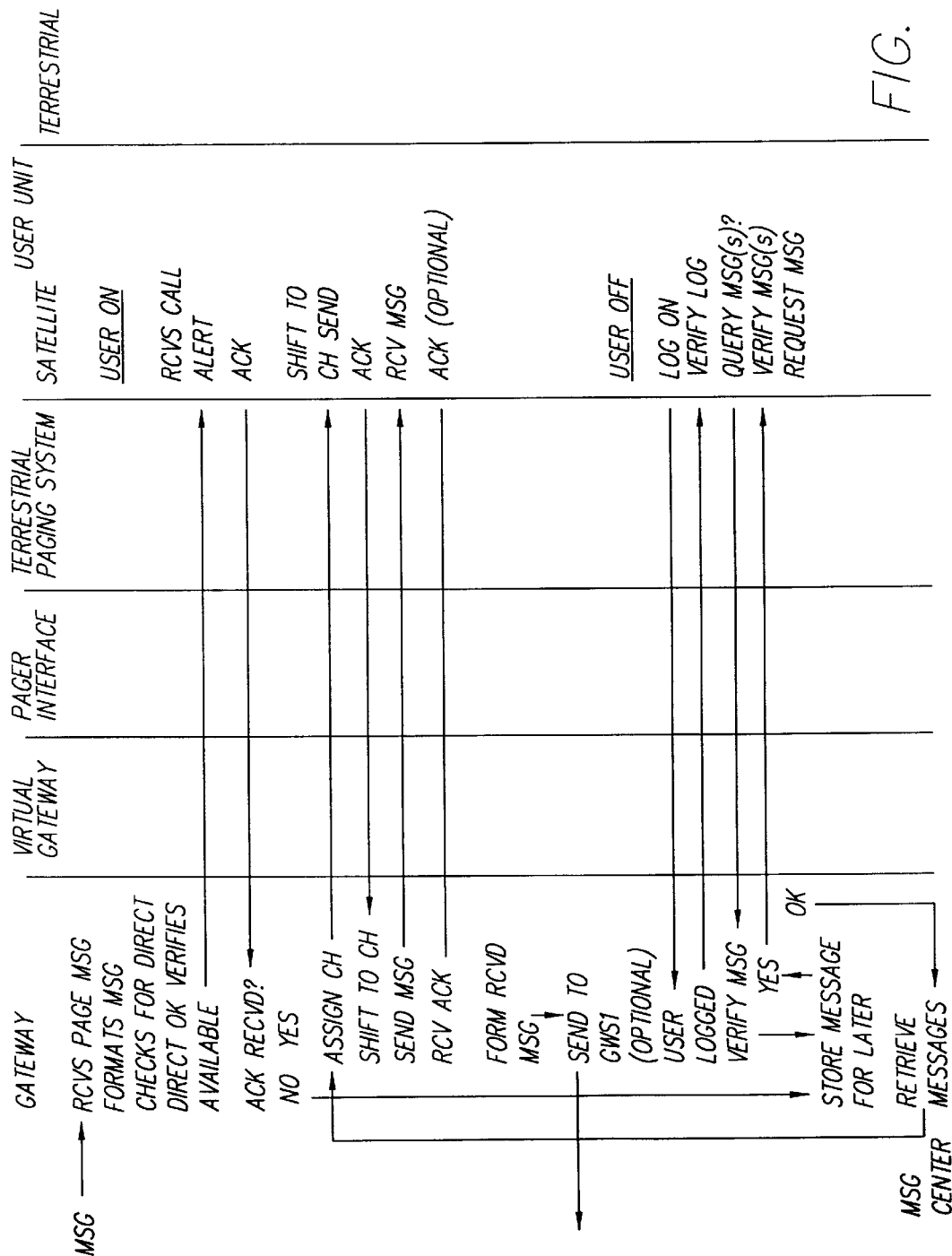
FIGS. 6A, 6B and 6C illustrate signal and operations flow for various operational modes of the dual mode system of FIG. 3A.
Figure 6B:
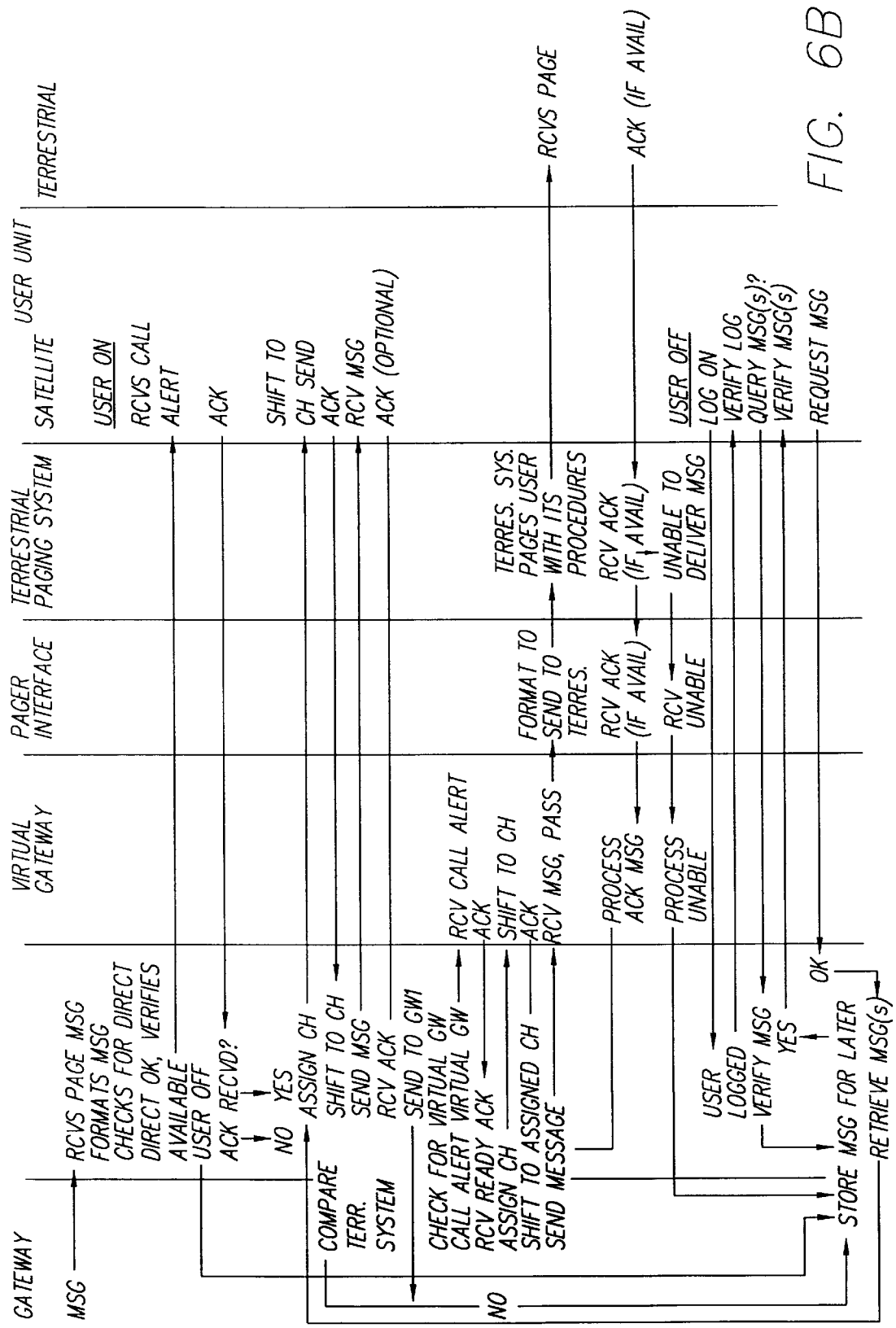
Figure 6C:
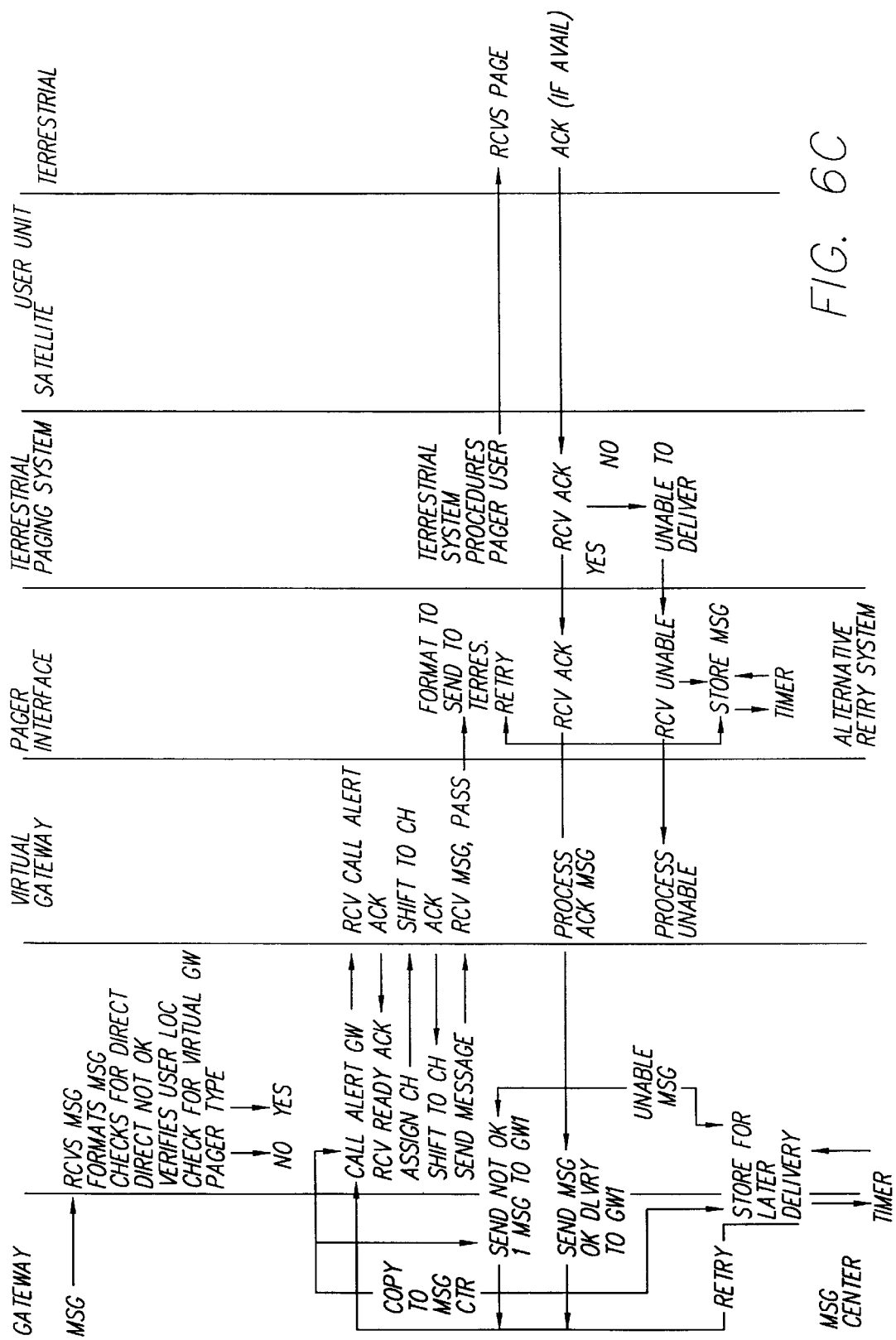

For the case of delivery by satellite only, and referring to FIG. 6A, the user unit 106 is capable of satellite reception only. The user unit 106 is logged into the system 10 and is attached (as an active user) to gateway GW2. The user unit 106 may be in one of several states when the paging message is transmitted from the GW2. For example, the user unit 106 may be turned on and receiving the satellite signals, the unit may be turned on and not receiving satellite signals (blocked by buildings or other obstructions), or the user unit 106 may be turned off. The operation of the system for each of these states is now discussed.

User unit 106 on and available:

The message from caller 101 is delivered to the paging subsystem 300 and is formatted to the appropriate message format required for delivery. The gateway (GW2) 103 then checks for the availability of direct delivery via satellite 105. If direct delivery is possible, the gateway 106 verifies that the user is logged in and active, first by checking the VLR (HLR if at home), then by verifying that the user is available to receive the message by sending a call alert over a "paging" channel. The user unit 106, if on, receives the call alert and sends an acknowledgement (ACK) back to the gateway 106. If instead the gateway 106 after "n" tries determines that the user unit 106 is not available, it instead sends the message with its associated ID to the message center 300 for later retrieval and/or resending at a future time. Assuming that the ACK has been received the gateway 103 notifies the user unit 106 of the appropriate channel to receive the message on (this may be the "paging" channel). The user unit 106 receives the channel information and shifts to the specified channel and notifies the gateway 103 of successful reception. The gateway 103, upon being notified that user unit 106 ready to receive, shifts to the appropriate channel and sends the message. The message received is demodulated, decoded and displayed to the user by the user unit 106. Optionally, the user unit 106 formats a received ACK and sends the ACK signal to the gateway 103. The gateway 103 receives the ACK and terminates the process, billing if appropriate, and optionally sends a received message (potentially merged with other received ACK messages from other pages) to GW1 103(a).

User unit off or not available but still located at GW2:

As before, the message from caller 101 is delivered to the paging subsystem 300 and is formatted to the appropriate message format required for delivery. The gateway (GW2) 103 then checks for the availability of direct delivery via satellite 105. If direct delivery is possible, the gateway 103 verifies that the user is logged in and active, first by checking the VLR (HLR if at home), then by verifying that the user is available to receive the message by sending a call alert over a "paging" channel. The user unit 106, if on, receives the call alert but does not send an ACK to the gateway 103 because the user unit 106 may be blocked to one or more satellites 105. If blocked or unavailable, the gateway 103 will after "n" tries determine that the user unit 106 is not available, and sends the message with its associated ID to the message center 302 for later retrieval and/or resending at a future time. If the gateway 103 finds that the user unit 106 is not logged in, but is still attached to GW2, the gateway also sends the message and ID to the message center 302. At a future time the user unit 106 logs onto the system 10 at gateway GW2. The gateway responds and sends a ready to receive message to the user unit 106. At this time or at a future time the user may query the message center 302 to determine if there are stored messages. In this case a query message, which includes the user's ID, is sent to the gateway 103 from the user unit 106, the gateway receives the query message and verifies via the message center 302 that one or more messages are available. A "yes" answer is formatted by the message center 302 if there is one or more stored messages for the user, else a "no" message is formatted. The formatted messages may be in the form of certain bits of data that can be decoded by the user unit 106 and displayed as "yes" or "no" for user. A verification of a message waiting is transmitted from the gateway 103 to the user unit 106. The user may then, if desired, retrieve the message(s) by formatting a "request" message signal and transmitting the request to the gateway 103. The gateway 103, after receiving the request for a message, sends a retrieve message signal to the message center 302, the messages are queued up (the messages may be further filtered or restricted by the user using additional commands imbedded in the request message), and are sent to the computing section 301 for delivery to the digital/analog section 400 for transmission from the gateway 103 to the user via an assigned channel.

User off or not available but not located at GW2:

The user may have moved from the location of GW2 to another GW(N) or to the home gateway. In this case the optional GW1 acknowledgment message is useful. It is assumed for this example that the user unit 106 has logged off at GW2 and has just logged on at GW(N). The GW(N) then queries the HLR database at GW1 to verify that the user unit 106 to be attached to GW(N) is valid and is authorized to be roaming. This procedure then triggers a query of the paging system 300 to verify that the messages sent have been received. Assuming that the user had logged off of GW2 before the message had been sent, and that the user had not requested his messages from GW2, no ACK of the message received would be known to GW1. In this case the GW1 formats another copy of the message(s) not delivered and transmits them according to the procedure described above, where upon the new gateway performs the tasks described above. After an appropriate length of time (for example a few days), absent the delivery of a stored message GW2 deletes the messages for the user from its database 303 and terminates efforts to page the user.

Delivery via Satellite with Terrestrial Back up

Referring now to FIG. 6B, the paging message is delivered in a similar manner to that of the satellite-only method according to the following procedure. The page message and user ID is received by GW2 or GW(N) depending on the user's current location.

User on and available:

The message from caller 101 is delivered to the paging subsystem 300 and is formatted to the appropriate message format required for delivery. The gateway (GW2) 103 then checks for direct delivery via satellite. If direct delivery is available the gateway 103 verifies that the user unit 106 is logged in and active, first by checking the VLR (HLR if at home), and then verifies that the user unit 106 is available to receive the message by sending a call alert over the "paging" channel. The user unit 106, if on, receives the call alert and sends an ACK to the gateway 103. If the ACK is not received the gateway 103, after "n" tries, determines that the user unit 106 is not available and sends the message with its ID to the message center 302 for future retrieval and/or retransmission.

Assuming for this case that the ACK is received the gateway 103 notifies the user unit 106 of the appropriate channel on which to receive the message (this may be the "paging" channel). The user unit 106 receives the channel information and shifts to the specified channel and notifies the gateway 103 of successful reception. The gateway 103, upon being notified that the user unit 106 is ready to receive, shifts to the appropriate channel and sends the message. The received message is demodulated, decoded and displayed to the user. optionally, the user unit 106 formats a received ACK and sends the received ACK to the gateway 103. The gateway 103 receives the ACK and terminates the process, billing if appropriate, and optionally sends a received message (potentially merged with other received ACK messages from other pages) to GW1 103(a).

User on but not available:

If the user unit 106 is logged in and is active, but does not respond to the call alert, the user unit 106 may have moved into a building or is otherwise blocked from all satellites in view. The system 10 responds to this situation by rerouting the call to the backup terrestrial paging system 109. The system 10, after "n" retries, checks for a virtual gateway 107 that can serve the user unit 106. First, the gateway 103 checks a database to determine if a compatible terrestrial paging system 109 is available that can serve the user unit 106. If it is determined that the dual mode user unit 106 does not have a compatibility with the terrestrial paging system 109 operating with the virtual gateway 107 near the location of the user unit 106, the gateway 103 routes the message to the message center 302 for later delivery.

If the user unit 106 is found to have a compatible terrestrial paging system 109, the gateway 103 instead attempts message delivery via the terrestrial paging system 109. The gateway 103 proceeds to make a call alert to the appropriate virtual gateway 107. The virtual gateway 107 responds with an ACK that it is ready to receive. The gateway 103 then assigns channel resources and notifies the virtual gateway 107 of the channel(s). The virtual gateway 107 shifts to the assigned channel(s) and notifies the gateway 103 that it is ready to receive, where upon the gateway 103 shifts to the assigned channel and transmits the message to the virtual gateway 107. The virtual gateway 107 receives the signal, down converts it to IF and if necessary to baseband, demodulates the signal and if necessary decodes the message. The received message is then passed to the pager interface unit 108 where it is formatted to send to the terrestrial paging system 109. A copy of the message is preferably made and stored in a memory within the pager interface unit 108, such as in an optional message storage and retrieval system 108a of the pager interface unit 108. The pager interface unit 108 formats the message to that required by the terrestrial paging system 109 and passes it on to the terrestrial paging system 109 along with the user ID. The pager interface unit 108 is preferably constructed in such a manner as to be able to interface to a plurality of different types of terrestrial paging systems. The message may be passed by the link 113, which may be a wired connection or a wireless connection. The terrestrial paging system 109 receives the page message from the link 113 and, according to its own method, attempts delivery to the user unit 106 over the alternate terrestrial delivery link 110. If the terrestrial paging system 109 has a delivery acknowledgment capability, an ACK is formed and passed back to the pager interface unit 108 over the link 113. Two types of ACK are possible: the first is a successful delivery ACK, the second is an unsuccessful ACK which notifies the pager interface unit 108 that the message is unable to be delivered. If successful, the pager interface unit 108 forms a successful delivery message and passes the message to the virtual gateway 107 for delivery to the gateway 103. The gateway 103 then optionally sends a delivered message to gateway GW1. If the terrestrial paging system 109 instead sends an unable to deliver message to the pager interface unit 108, it forms an unable to deliver message and passes it to the virtual gateway 107 for delivery to the gateway 103. The gateway 103 then stores a copy of the message for later delivery in the message center 302, and notifies the GW1 that the message was unable to be delivered.

At some future time the user unit 106 logs onto the system 10 at gateway GW2. The gateway responds and sends a ready to receive message to the user unit 106. At this time or at a future time the user may query the message center 302 to determine if there are any stored messages. A query message is sent to the gateway GW2, the gateway receives the query message and verifies via the message center 302 that message(s) are available. A "yes" answer is formatted by the message center 302 if there are messages, else a "no" message is formatted by the message center 302. These formatted messages may be in the form of bits of data that can be decoded by the user unit 106 and displayed as "yes" or "no" to the user. The verification of messages waiting is then transmitted from the gateway 103 to the user unit 106. The user then may, if desired, retrieve the messages by formatting a request message signal and transmitting the request message to the gateway 103. The gateway 103, after receiving the request message, sends a retrieve message to the message center 302 whereby the message(s) are queued (the messages may be further filtered or restricted by the user using additional commands imbedded in the request message) and sent to the computing section 301 for delivery to the digital/analog section 400 for transmission from the gateway 103 to the user via an assigned channel, as described previously.

Generally, the user unit 106 is available during this step, but may become blocked to the satellites (i.e., unavailable) during the retrieval process. If this is the case, the system 10 will repeat the process of alternatively trying to deliver the message via the terrestrial paging system 109 if the attempt at delivery by satellite is unsuccessful.

If the user has moved from the location of GW2 to another GW(N) or to his home gateway the potential to deliver the message from GW2 is not available. In this case the optional GW1 acknowledgment message is useful. Assume that the user has logged off at GW2 and has just logged on at GW(N), the GW(N) then queries the HLR database at GW1 to verify that a user unit 106 attempting to become attached to GW(N) is valid and is authorized to be roaming. This procedure then triggers a query of the paging system 300 to verify that all transmitted messages sent have been successfully received. Assuming that the user unit 106 had logged off of GW2 before the message had been able to be sent, and that the user unit 106 had not requested stored messages from GW2, no ACK of message received would be known to GW1. In this case, GW1 then formats another copy of the message(s) not delivered and transmits them according to the procedure described above. As described previously, after some period of time any unsuccessfully transmitted messages may be deleted from the system 10.

Delivery via the Terrestrial Paging System with Satellite Back Up:

This method is similar to that described above, except that the terrestrial attempt is made first, and the satellite system is used as a back up in case the terrestrial attempt fails.

Delivery via Terrestrial Only

Reference is made to FIG. 6C for a method of message delivery to a user unit 106 that only has the terrestrial paging system 109 as a means of receiving a page. This method is useful where a user unit 106 is able to roam from one system to another, so long as the two systems are compatible. The page message is received by the gateway 103 and is sent to the paging subsystem 300 where it is formatted for delivery. The gateway 103 checks for direct delivery by other means, and finds that the user unit 106 is only reachable by a terrestrial paging system. The gateway 103 verifies the general location of the user unit 106 from the location database and possibly from information provided by GW1. The gateway 103 then checks for a virtual gateway 107 that is compatible with the user unit 106 within range of the terrestrial paging system 109. If one is not found, an unable to deliver message is formulated and passed to the originating gateway 103. If a virtual gateway 107 that is compatible with the user unit 106 is found the gateway 103 sends a copy of the message and user ID to the message center 302 and makes a call alert to the selected virtual gateway 107. The virtual gateway 107 receives the call alert and sends a ready to receive ACK in reply. The ready to receive ACK is received by the gateway 103 which then assigns channel resources to the virtual gateway 107. The channel resource message is received by the virtual gateway 107 which then shifts to the assigned channel(s) and sends an ACK. The gateway 103, upon receiving the ACK from the virtual gateway 107, sends the page message. The virtual gateway 107 receives the page message and passes it to the pager interface unit 108. The pager interface unit 108 receives the page message and user ID, formats the message as required by the terrestrial paging system 109, and sends the formatted message via the link 113 to the terrestrial paging system 109. The terrestrial paging system 109 then operates according to its own procedures to deliver the message to the user unit 106. The user unit 106 receives the page message and displays the message to the user. An ACK of delivery (if available) is sent to the terrestrial paging system 109 by the user unit 106. The terrestrial paging system 109 receives the optional ACK and, if successful, forms a page delivered message and sends it to the pager interface unit 108 and thence to the virtual gateway 107. The virtual gateway 107 processes the ACK message and at an appropriate time, preferably with other traffic or messages, sends the page delivered ACK message information to the gateway GW2. The gateway 103 then sends a page delivery message to the originating gateway. If the message was unable to be delivered, an unable to deliver message is instead formed by the terrestrial paging system 109 and is passed to the paging interface unit 108 for eventual delivery back to the GW2. In this case a timer is activated for a later delivery retry. The retry after a specified length of time is directed to the call alert process of the gateway 103 so as to automatically trigger a redelivery attempt of the stored page message. If unsuccessful after "n" retries, the page message is deleted.

An alternative method, if unable to deliver the page message, uses the optional message storage and retrieval system 108a in the pager interface unit 108. The local storage of the undelivered page message beneficially offloads the retry function from the satellite system and thus conserves satellite system resources. In this case, and if the message is unable to be delivered, the message is eventually deleted from the message storage and retrieval system 108a, and the gateway 103 is notified via the virtual gateway 107. The gateway 103 is also notified if one of the retry attempts successfully delivers the stored page message from the message storage and retrieval system 108a.

It may be the case, as was described previously, that the user unit 106 may have moved from the location of GW2 to another GW(N) or to the home gateway. In this case the optional GW1 acknowledgment message can be used in the manner described previously.

Although described in the context of specific embodiments, it should be realized that a number of modifications may occur to those skilled in the art. As but one example, it is within the scope of the teaching of this invention to provide a capability for the user to notify the serving gateway, using a suitable signaling protocol, that the serving gateway is to default to using only the satellite page delivery route or the terrestrial paging system route for some specified time, or until notified of a further change. For example, before the user carries the user unit 106 into a building the user can notify the serving gateway to use only the terrestrial paging system 109 if a page message is received for the user, thereby enabling the system 10 to conserve satellite system resources when first attempting to reach the user.

Thus, while the invention has been particularly shown and described with respect to preferred embodiments thereof, it will be understood by those skilled in the art that changes in form and details may be made therein without departing from the scope and spirit of the invention.

What is claimed is:

1. A communications system, comprising:
   a satellite system component that includes at least one satellite; and
   at least one terrestrial gateway that comprises a transmitter and a receiver for being bidirectionally coupled to said at least one satellite;
   said communications system further comprising at least one terrestrial paging system; and
   at least one user unit for being wirelessly coupled to said at least one terrestrial gateway, through said at least one satellite, or to said at least one terrestrial paging system; wherein
   said at least one gateway comprises a paging system for receiving a page message for said at least one user unit, for storing said received page message, and for attempting to selectively deliver said received page message to said user unit through one of said at least one satellite or through said terrestrial paging system; and
   further comprising at least one virtual gateway that is bidirectionally coupled to said terrestrial paging system and to said at least one gateway through said at least one satellite, said virtual gateway being responsive to an assignment of satellite system component resources from said at least one gateway through said at least one satellite for using the assigned satellite system component resources for receiving a page message for said at least one user unit, and for inputting the received page message into said terrestrial paging system.

2. A communications system as in claim 1, wherein said at least one gateway is bidirectionally coupled to said at least one terrestrial paging system through said at least one satellite, said virtual gateway, and a pager interface unit.

3. A communications system as in claim 2, wherein said pager interface unit is comprised of a pager message and retrieval system for storing a page message until it is determined that the page message can be one of successfully delivered or not successfully delivered to the user unit via the terrestrial paging system.

4. A communications system as in claim 2, wherein said pager interface unit is further comprised of means, responsive to an acknowledgement of page message delivery through said at least one terrestrial paging system, for storing an indication of the delivery of the page message and for transmitting the stored indication to said at least one gateway through said virtual gateway and said at least one satellite.

5. A communications system as in claim 1, wherein said at least one gateway selectively delivers said received page message based on a content of at least one of a Home Location Register or a Visitor Location Register.

6. A communications system as in claim 1, wherein said at least one gateway selectively delivers said stored page message using at least one retry through an originally selected page message delivery route or through an alternate page message delivery route.

7. A communications system as in claim 1, wherein said system is further comprised of means, responsive to an acknowledgement of page message delivery, for recording the delivery of the page message for billing purposes.

8. A communications system as in claim 1, wherein said system is responsive to a case where the attempted delivery of the page message is unsuccessful for, at some future time, informing a user of the user unit of the existence of the stored page message and, in response to a request from the user, retrieving and delivering the stored page message.

9. A communications system, comprising:
 a satellite system component comprised of at least one satellite; and
 at least one terrestrial gateway that comprises a transmitter and a receiver for being bidirectionally coupled to said at least one satellite;
 said communications system further comprising at least one terrestrial paging system; and
 at least one user unit for being wirelessly coupled to said at least one terrestrial paging system; wherein
 said at least one gateway comprises a paging system for receiving a page message for said at least one user unit, for storing said received page message, and for delivering said received page message to said user unit through said terrestrial paging system through said at least one satellite, a virtual gateway, and a pager interface unit; and
 wherein said virtual gateway is bidirectionally coupled to said terrestrial paging system and to said at least one gateway through said at least one satellite, said virtual gateway being responsive to an assignment of satellite system component resources from said at least one gateway through said at least one satellite for using the assigned satellite system component resources for receiving a page message for said at least one user unit, and for inputting the received page message into said terrestrial paging system.

10. A communications system as in claim 9, wherein said pager interface unit is comprised of a pager message and retrieval system for storing a page message until it is determined that the page message can be one of successfully delivered or not successfully delivered to the user unit via the terrestrial paging system.

11. A communications system as in claim 9, wherein said at least one gateway selects a virtual gateway and terrestrial paging system based on a content of at least one of a Home Location Register or a Visitor Location Register.

12. A communications system as in claim 9, wherein said system is further comprised of means, responsive to an acknowledgement of page message delivery, for recording the delivery of the page message for billing purposes.

13. A communications system as in claim 9, wherein said pager interface unit is further comprised of means, responsive to an acknowledgement of page message delivery through said at least one terrestrial paging system, for storing an indication of the delivery of the page message and for transmitting the stored indication to said at least one gateway through said virtual gateway and said at least one satellite.

14. A method for delivering a page massage to a user unit, comprising the steps of:
 receiving and storing a page message at a terrestrial gateway that forms, in conjunction with at least one satellite, a satellite communication system component;
 determining a last known location of the user unit;
 selecting, at least partially in accordance with the last known location, one of a page message satellite delivery method or a page message terrestrial paging system delivery method; and
 attempting to deliver the stored page message to the user unit using the selected method, wherein if the selected method is the page message terrestrial paging system delivery method, further comprising steps of making a temporary assignment of satellite system component resources to a selected virtual gateway, and then delivering the stored page message to a terrestrial paging system via said selected virtual gateway using the assigned satellite system component resources.

15. A method as in claim 14, wherein if the attempted delivery is not successful using the selected method, further comprising the step of attempting to deliver the page message using the other method.

16. A method as in claim 14, and further comprising a step of transmitting a page message delivered acknowledgement signal to a home gateway of the user unit.

17. A method as in claim 16, wherein the page message delivered acknowledgement signal originates at the user unit.

18. A method as in claim 16, wherein the page message delivered acknowledgement signal originates at the terrestrial paging system.

19. A method as in claim 16, wherein the page message delivered acknowledgement signal originates at the gateway.

20. A method as in claim 14, and for a case where the attempted delivery of the page message is unsuccessful, further comprising steps of:
 at some future time, informing a user of the user unit of the existence of the stored page message; and
 in response to a request from the user, retrieving and delivering the stored page message.

21. A method as in claim 14, wherein the page message is first received at a first gateway, and is routed to a second gateway for delivery to the user unit.

22. A method as in claim 21, wherein the page message is routed at least partially through a terrestrial communications network.

23. A method as in claim 21, wherein the page message is routed at least partially through a satellite communications network.

24. A method as in claim 23, wherein the page message is temporarily stored aboard at least one satellite when being routed at least partially through the satellite communications network.

25. A method for delivering a page massage to a user unit, comprising the steps of:
 receiving a page message at a first terrestrial gateway that forms, in conjunction with at least one satellite and at least one second terrestrial gateway, a satellite communication system component;

determining a last known location of the user unit;

routing the page message to the second terrestrial gateway based on the last known location and storing the page message at the second terrestrial gateway;

selecting, at the second terrestrial gateway, one of a page message satellite delivery method or a page message terrestrial paging system delivery method; and attempting to deliver the stored page message from the second terrestrial gateway to the user unit using the selected method, wherein if the selected method is the page message terrestrial paging system delivery method, further comprising steps of making a temporary assignment of satellite system component resources to a selected virtual gateway, and then delivering the stored page message to a terrestrial paging system via said selected virtual gateway using the assigned satellite system component resources.

26. A method as in claim 25, wherein if the attempted delivery is not successful using the selected method, further comprising the step of attempting to deliver the page message using the other method.

27. A method as in claim 25, and further comprising a step of transmitting a page message delivered acknowledgement signal to the first terrestrial gateway.

28. A method as in claim 27, wherein the page message delivered acknowledgement signal originates at the user unit.

29. A method as in claim 27, wherein the page message delivered acknowledgement signal originates at the terrestrial paging system.

30. A method as in claim 27, wherein the page message delivered acknowledgement signal originates at the second terrestrial gateway.

31. A method as in claim 25, and for a case where the attempted delivery of the page message is unsuccessful, further comprising steps of:

at some future time, informing a user of the user unit of the existence of the stored page message; and in response to a request from the user, retrieving and delivering the stored page message.

32. A method as in claim 25, wherein the step of routing occurs at least partially through a terrestrial communications network.

33. A method as in claim 25, wherein the step of routing occurs at least partially through a satellite communications network.

34. A method as in claim 33, wherein the page message is temporarily stored aboard at least one satellite when being routed at least partially through the satellite communications network.

35. A communications system, comprising:

a non-geosynchronous constellation of satellites disposed in a Walker orbital configuration;

at least one terrestrial gateway comprising at least one first RF transceiver for bidirectionally coupling said gateway to at least one satellite of said constellation of satellites, said gateway also being bidirectionally coupled to a terrestrial telecommunications system; and a plurality of user terminals each comprising at least one second RF transceiver for being wirelessly coupled to said at least one terrestrial gateway, through said at least one satellite, or to a terrestrial paging system; wherein said at least one gateway comprises a paging system for receiving page messages for individual ones of said plurality of user terminals and for attempting to selectively deliver received page messages to appropriate ones of said plurality of user terminals through said constellation of satellites or through said terrestrial paging system; and further comprising at least one virtual gateway that is bidirectionally coupled to said terrestrial paging system and also to said at least one gateway through said at least one satellite, said virtual gateway being responsive to an assignment of at least one satellite channel from said at least one gateway for using the assigned satellite channel for receiving a page message for one of said user terminals, and for forwarding the received page message to said terrestrial paging system.

* * * * *